United States Patent

Kohl

[11] 4,056,012
[45] Nov. 1, 1977

[54] LINKAGE SYSTEM FOR WARP KNITTING MACHINE

[76] Inventor: Karl Kohl, 10 Chlorodont Strasse, Obertshausen, Germany, 6053

[21] Appl. No.: 520,174

[22] Filed: Nov. 1, 1974

[30] Foreign Application Priority Data

Nov. 2, 1973  Germany .............................. 2354824
Nov. 5, 1973  Germany .............................. 2355235

[51] Int. Cl.² .............................................. F16H 21/40
[52] U.S. Cl. ..................................................... 74/81
[58] Field of Search ..................... 74/40, 81; 66/84 A

[56] References Cited

U.S. PATENT DOCUMENTS

| | | | |
|---|---|---|---|
| 389,665 | 9/1888 | Orford | 74/40 |
| 1,739,171 | 12/1929 | Paine | 74/81 |
| 2,387,283 | 10/1945 | Oakley | 74/81 |
| 2,487,253 | 11/1949 | Lyle et al. | 74/81 |
| 2,830,455 | 4/1958 | Harmon | 74/40 |
| 2,873,611 | 2/1959 | Biermann | 74/40 |
| 2,946,243 | 7/1960 | Gothe | 74/40 |

Primary Examiner—Samuel Scott
Assistant Examiner—Wesley S. Ratliff, Jr.
Attorney, Agent, or Firm—Behr & Woodbridge

[57] ABSTRACT

A warp knitting machine includes a linkage system for translating the rotational motion of a drive crank into a back and forth movement suitable for a weft inserting mechanism. The linkage system includes five separate linkage elements. A first linkage element drives a second linkage element which in turn causes a third linkage element to rotate around a fixed reference point. A fourth linkage element is connected to the junction of the second and third linkage elements at one end and at the other end is connected to a fifth linkage element. The fifth linkage element is pivoted in the center thereof. The rotational motion of the first linkage element causes the fifth linkage element to move in a backward and forward direction. The linkage elements are arranged relative to one another according to a special relationship which helps to smooth out the accelerative forces and to prevent dead points where the linkage elements may lock. The smoother accelerative characteristic is achieved in part by making the distance between the fixed end of the third linkage and the pivot point of the fifth linkage less than the effective length of the third linkage itself. Additionally, the effective length of the third linkage element is deliberately made greater than the distance from the pivot section of the fifth linkage to the point of connection between the fourth linkage and the fifth linkage.

2 Claims, 2 Drawing Figures

LINKAGE SYSTEM FOR WARP KNITTING MACHINE

BACKGROUND OF THE INVENTION

1. Field of the Invention

This invention relates generally to a motion transmitting linkage system and more particularly to a linkage system for use in a warp knitting machine.

2. Description of the Prior Art

Warp knitting machines and the mechanisms used for driving a weft inserter are well known to those of ordinary skill in the knitting machine art. One of the difficulties with such prior art mechanisms is that due to the construction of prior art linkages, blocking or locking frequently occurs at the dead points of the machine's cycle. This might occur, for instance, where two links are directly in line and it is not possible to achieve enough mechanical advantage to cause the links to pivot with respect to their common point. To avoid linkage blocking, it has often been necessary to resort to high accelerative forces at the turn around points. These points frequently occur where the rate of change of the sinusoidal motion curve of the driven link member runs through a comparatively small drive crank angle. Prior art has been known to avoid dead spots by equipping two mutually joined members with complicated aiding devices. Examples of prior art devices are to be found in U.S. Pat.No. 3,772,924 and U.S. Pat. No. 1,760,960.

It was in the context of the foregoing problems that the present linkage system was invented.

SUMMARY OF THE INVENTION

The present invention comprises five linkage means connected together in such a fashion as to reduce the acceleration problems associated with prior art warp knitting machine linkage systems. A first drive crank linkage means rotates around its first end and has a second end connected to the first end of a second linkage means. The second end of the second linkage means is connected to the first end of a third linkage means the second end of which is rotatably connected to a first reference point. The junction between the second and third linkage means is rotatably connected to a first end of a fourth linkage means. The second end of the fourth linkage is rotatably connected to a first end of a fifth linkage means. The fifth linkage means is an output driving means and is adapted to drive an output mechanism at the second end thereof. The fifth linkage means is pivotally connected at a point intermediate the two ends thereof to a second reference point. The second reference point may be moved transversely perpendicular to the length of the third linkage means. In operation, the rotation of the first linkage means causes the forward and backward reciprocation of the second end of the fifth linkage means. The dead spot and acceleration problems associated with prior art linkages are avoided by placing the second reference point somewhere approximately intermediate the first and second ends of the third linkage means. In this fashion the length of the third linkage means is greater than the distance between the first and second reference points. Additionally, the effective lever length of the fifth linkage means is made less than the length of the third linkage means from its first end to its second end. The effective length of the fifth linkage means is defined as the distance from its center pivot point to its first end. According to the prior art, it is known to place a drive-off or a driven linkage device on the side of the linkage system which is furthest removed from the pivot point of a linkage guide bar. This arrangement may result in undesirable accelerative forces and occasional linkage blocking. In order to overcome these problems, the pivot point of the driven linkage element is placed closer to the pivot point of a lever guide bar so that the length of the lever guide bar is greater than the distance between the pivot point of the driven link and the pivot point of lever guide bar. In other words, the length of the third linkage means is greater than the distance between the first and second reference point. Additionally, or as a corollary to the above, the length of the third lever means is greater than the effective length of the fifth linkage means as measured from the first end to the pivot section thereof.

The position of the fifth linkage means can be adjusted by means of a slider and a rail in a direction perpendicular to the length of the third linkage. The output mechanism driven by the fifth linkage means can, according to one embodiment of the present invention, consist of a gear driven pulley arrangement. In that embodiment, a rack gear at the second end of the fifth linkage means engages a pinion gear rigidly connected to and concentrically mounted with a flanged pulley. Passing around the pulley is a cable which is caused to move in a backward and forward direction in response to the reciprication of the fifth linkage means.

The means for driving said first linkage is conventional. While in no way limiting this invention to the use thereof a drive means which may be employed is illustrated in FIG. 2 of Suffner, U.S. Pat. No. 3,772,924, the disclosure of which is incorporated herein by reference.

These and other features of the present invention will be more fully understood with reference to the following drawings.

DESCRIPTION OF THE INVENTION

Figure 1:
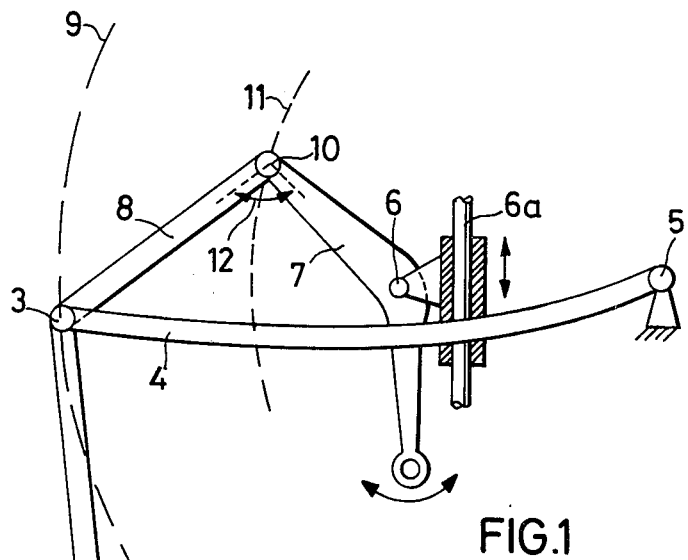
FIG. 1 is a schematic representation of the linkage system according to the present invention.
Figure 2:
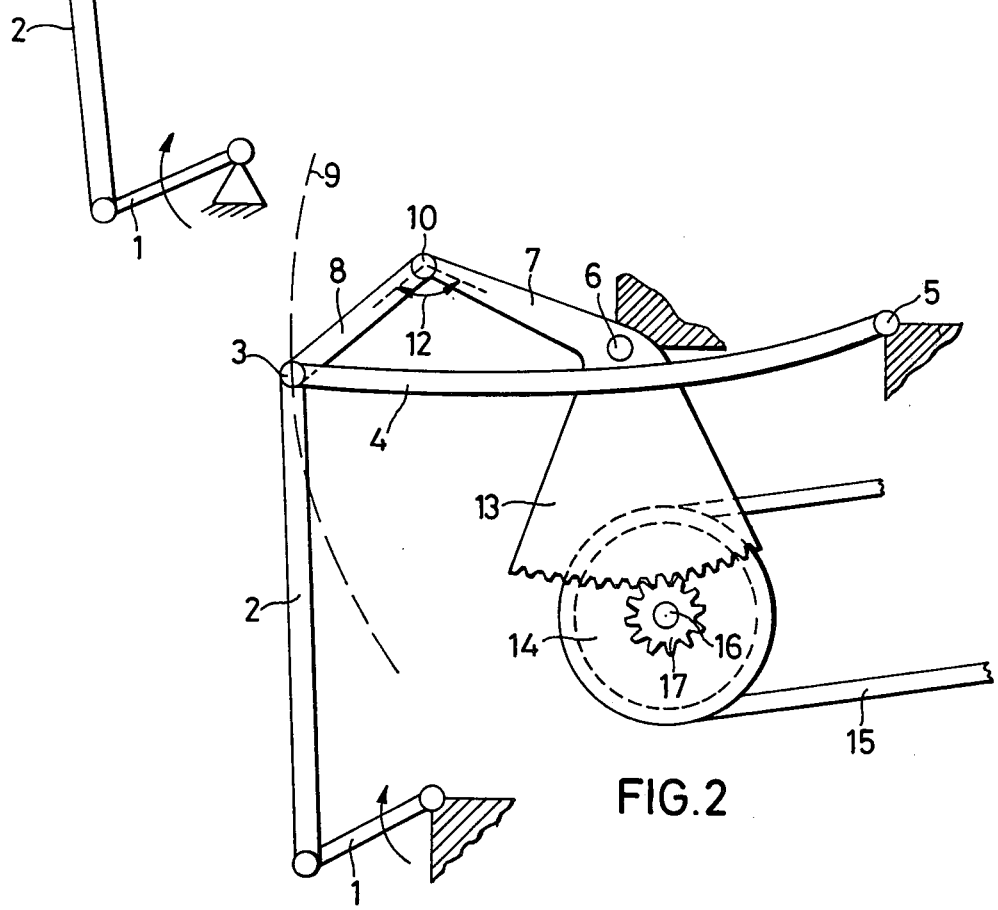
FIG. 2 is a schematic representation of the present invention showing in further detail the weft inserter output drive mechanism associated with this warp knitting machine.

During the course of this description, like numerals will be used to indicate like elements according to both FIG. 1 and FIG. 2.

The linkage system of the present invention is shown in general detail in FIG. 1. The system comprises a plurality of lever means which cooperate in a novel fashion, as will be evident from the following description.

A first linkage means 1 comprises a rotating crank lever which rotates about its first end in a manner known to those of ordinary skill in the knitting machine art. The prime mover for linkage means 1 could be a motor or a drive shaft or similar device. This element was not illustrated since it is not necessary to the understanding of the invention as a whole and since conventional devices for performing this function are well known. The second end of the first linkage means 1 is rotatably connected to the first end of the second linkage means 2. The second end of the second linkage means 2 is rotatably or pivotally connected at a common point 3 to the first end of a third linkage means 4.

The second end of the third linkage means 4 is rotatably connected to a first reference point 5. Reference point 5 is rotatably attached to some firm anchor point. The junction point 3 of the second lever 2 and third lever 4 is also rotatably connected to the first end of a fourth linkage means 8. The second end of the fourth linkage means 8 is rotatably connected to the first end of a fifth linkage means 7 at a common point 10. The fifth linkage means is rotatably connected at a pivot section intermediate the first and second ends thereof to a second reference point 6. The reference point 6 may be repositioned by moving a slider member as illustrated with shading up and down a guide rod 6a. Guide rod 6a extends transversely in a direction approximately perpendicular to the length of the third linkage means 4.

In operation, the rotation of the first linkage means 1 causes the second end of the fifth linkage means 7 to reciprocate in a backward and forward manner. During the course of the linkage movement, the common junction points 3 and 10 describe arcs 9 and 11 respectively. The radius of arc 9 corresponds to the length of the third linkage means 4 as measured from the first end thereof 3 to the second end 5 which corresponds to the first reference point. Similarly, the radius of arc 11 corresponds to the distance from the first end 10 of the fifth linkage means 7 to the pivot section thereof, i.e. the second reference point 6. It is clear from this description and from FIG. 1 that arc 11 falls between arc 9 and the fixed reference point 5. This relationship is achieved by the fact that the length of the third linkage means 4, that is the distance from point 3 to point 5, is greater than the distance from fixed reference point 5 to the second reference point 6. Additionally, the distance from point 3 to point 5 is greater than the effective length of the fifth linkage means 7 from point 10 to point 6. By keeping these relationships, it is possible to avoid the dead points and dangerous accelerative forces that are associated with prior art warp knitting machine linkages.

The positioning the pivot point, i.e. the second reference point 6 may be adjusted by moving a slider box along the length of a guide rod 6a. The direction of rod 6a is approximately perpendicular to the length of the third linkage means 4 when the angle 12 between the fourth linkage means 8 and the fifth linkage means 7 is approximately 90°. The angle 12 may be varied by moving the slider to a different location along guide rod 6a. However, as a matter of convenience, it is preferable that angle 12 be approximately 90° when point 3 is midway through its length of travel along arc 9.

According to the embodiment of FIG. 2, a linkage system generally described in FIG. 1 is shown in the context of a warp knitting weft inserter drive mechanism. According to this example, the point 6 is rigidly and rotatably attached to the second reference point. However, it will be understood that as in FIG. 1 the reference point 6 could be attached to an adjustable mechanism. The second end of the fifth linkage means 7 comprises a rack gear section 13. The rack section 13 engages a pinion gear 17 which is mounted on shaft 16. Also, concentrically mounted on shaft 16 is a flanged pulley 14. A cable 15 continuously engages the periphery of pulley 14 so that the movement of pulley 14 causes the cable 15 to move. Both pinion gear 17 and pulley 14 are concentrically and rigidly connected to the same shaft 16 so that the movement of one causes the respective movement of the other.

In operation, as the drive crank linkage means 1 rotates in a conventional manner, the rack section 13 of the fifth linkage means 7 is caused to reciprocate in a backward and forward manner. The reciprocation of the rack 13 is transmitted through the gear teeth to pinion gear 17. Pinion gear 17 in turn transmits the rotation through shaft 16 to pulley 14 and therefore to cable 16. A weft inserter mechanism of the sort well known to those of ordinary skill in the art is rigidly attached to the cable 15. Therefore, as the first linkage means 1 rotates the rack section 13 travels forward and backward thereby causing the cable 15 to travel forward and backward in a similar manner. In this fashion, the weft inserter which is attached to cable 15 is caused to travel completely across the length of the vertical threads and back again carrying with it all this time the thread which will eventually be knitted into the fabric being worked upon.

According to the example of FIG. 2, the tooth rack 13 is shown substantially in the middle position of angle 12 which is approximately 90° as was discussed with reference to FIG. 1. When the machine is initially adjusted, the position of the rack 13 is located so that during its travel the angle 12 may become an actue angle but in no circumstances does it approach close to 180°. Since angle 12 never becomes 180°, the danger of blocking in the dead position is thereby avoided. It will be noted also that the length of the third linkage means 4 is again greater than the distance between reference point 5 and 6. Moreover, as was illustrated with reference to FIG. 1, the length of the third linkage means 4 is greater than the effective radius of the fifth linkage means 7 between points 6 and 10. It is these relationships which contribute to a substantial flattening of the acceleration curve.

While the invention has been particularly shown and described with reference to the preferred embodiment thereof, it will be understood by those skilled in the art that various changes in form and detail may be made therein without departing from the spirit and scope of the invention.

I claim:
1. A motion transmitting linkage system including a plurality of linkage means, each having at least a first and a second end, said system comprising:
   a first linkage means for driving said system, said first linkage means being adapted to rotate about the first end thereof;
   a second linkage means having the first end thereof rotatably connected to the second end of said first linkage means;
   a third linkage means having the first end thereof rotatably connected to the second end of said second linkage means and having the second end thereof rotatably attached to a first relatively fixed reference point, said first end of said third linkage means being adapted to describe a first arc about said first relatively fixed reference point;
   a fourth linkage means having a first end thereof rotatably connected to the second end of said second linkage means;
   a fifth linkage means having the first end thereof rotatably attached to the second end of said fourth linkage means and the second end thereof adapted for connection to an output mechanism, said fifth linkage means including a pivot section located intermediate said first and said second ends thereof, said pivot section being adapted for rotatable attachment about a second relatively fixed reference point, said second relatively fixed reference point being located substantially within the ambit of said third linkage means when it describes said first arc, said first end of said fifth linkage means being adapted to describe a second arc about said second fixed reference point; and, an adjustment means for moving said second relatively fixed reference point in a direction approximately perpendicular to the effective length of the third linkage means when the angle between said fourth and fifth linkage means is approximately 90° with respect to one another at the common point thereof, wherein the effective length of the third linkage means measured from its first end to its second end is greater than the distance between said first relatively fixed reference point and said second relatively fixed reference point and further, wherein said effective length of said third linkage means is greater than the distance from the first end of said fifth linkage means to the pivot section of said fifth linkage means so that the radius of curvature of said first arc is greater than the radius of curvature of said second arc.

2. The system of claim 1 wherein the second end of said fifth linkage means includes a rack gear; and said output means comprises:

a pinion gear adapted for engagement with said rack gear;

a flanged drive wheel rigidly connected to and concentrically mounted with said pinion gear; and a cable means adapted for continuous engagement with the periphery of said flanged wheel;

wherein the back and forth motion of said fifth linkage means is translated into a back and forth movement in said cable means.

* * * * *